(12) United States Patent
Vadhavkar et al.

(10) Patent No.: US 9,973,103 B1
(45) Date of Patent: May 15, 2018

(54) SYSTEM FOR POWER CONVERSION WITH REACTIVE POWER COMPENSATION

(71) Applicant: Rockwell Automation Technologies, Inc., Mayfield, OH (US)

(72) Inventors: Prathamesh R. Vadhavkar, Grafton, WI (US); Brian J. Seibel, Grafton, WI (US); Russel J. Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days. days.

(21) Appl. No.: 15/408,786

(22) Filed: Jan. 18, 2017

Related U.S. Application Data

(60) Provisional application No. 62/438,666, filed on Dec. 23, 2016, provisional application No. 62/438,636, filed on Dec. 23, 2016.

(51) Int. Cl.
*H02M 5/458* (2006.01)
*H02M 1/42* (2007.01)
(Continued)

(52) U.S. Cl.
CPC .......... *H02M 5/458* (2013.01); *G05B 19/042* (2013.01); *H02M 1/12* (2013.01); *H02M 1/32* (2013.01);
(Continued)

(58) Field of Classification Search
None
See application file for complete search history.

(56) References Cited

U.S. PATENT DOCUMENTS

| 5,731,965 A * | 3/1998 | Cheng ................ H02J 3/01 307/105 |
| 2012/0081058 A1* | 4/2012 | Bortolus ............ H02K 11/001 318/490 |

(Continued)

OTHER PUBLICATIONS

M. Parvez et al.; "An improved active-front-end rectifier using model predictive control," 2015 IEEE Applied Power Electronics Conference and Exposition (APEC), Charlotte, NC, 2015, pp. 122-127.

(Continued)

*Primary Examiner* — Henry Lee, III
(74) *Attorney, Agent, or Firm* — Boyle Fredrickson, SC

(57) ABSTRACT

A power conversion system can be implemented to actively control a load while compensating for reactive power which may be sourced or consumed by an input filter circuit. In one aspect, the power conversion system can receive externally supplied multi-phase AC electric power, such as three-phase power from a power grid, and use a converter circuit to generate a DC bus. The power conversion system can then use an inverter circuit to generate multi-phase AC electric power from the DC bus for driving the load with adjustable frequencies and/or amplitudes as desired. The input filter circuit can be coupled to the converter circuit to filter out harmonics resulting from switching of the converter circuit. The power conversion system can receive feedback signals which may be used to determine reactive power sourced or consumed by the filter circuit, and can adjust the converter circuit to compensate for such reactive power.

18 Claims, 3 Drawing Sheets

(51) Int. Cl.
  *H02M 1/12* (2006.01)
  *H02M 1/32* (2007.01)
  *H02P 27/08* (2006.01)
  *G05B 19/042* (2006.01)
(52) U.S. Cl.
  CPC .............. *H02M 1/42* (2013.01); *H02P 27/08* (2013.01); *G05B 2219/41432* (2013.01)

(56) References Cited

U.S. PATENT DOCUMENTS

2012/0212982 A1   8/2012   Wei et al.
2014/0152012 A1*  6/2014   Kim .................. H02P 9/007
                                              290/44

OTHER PUBLICATIONS

M. Parvez et al.; "A robust modified model predictive control (MMPC) based on Lyapunov function for three-phase active-front-end (AFE) rectifier," 2016 Applied Power Electronics Conference and Exposition (APEC), Long Beach, CA, 2016, pp. 1163-1168.

Daniel E. Quevedo et al.; "Model Predictive Control of an AFE Rectifier With Dynamic references," in IEEE Transactions on Power Electronics, vol. 27, No. 7, pp. 3128-3136, Jul. 2012.

T.F. Wu et al.; "Capacitor-current compensation with fast voltage loop for D-Σ digital control based three-phase four-wire inverter," 2015 IEEE 2nd International Future Energy Electronics Conference (IFEEC), Taipei, 2015, pp. 1-6.

T.F. Wu et al.; "Iterative learning control with filter-capacitor current compensation for a three-phase four-wire inverter," 2013 Twenty-Eighth Annual IEEE Applied Power Electronics Conference and Exposition (APEC), Long Beach, CA, 2013, pp. 2288-2294.

* cited by examiner

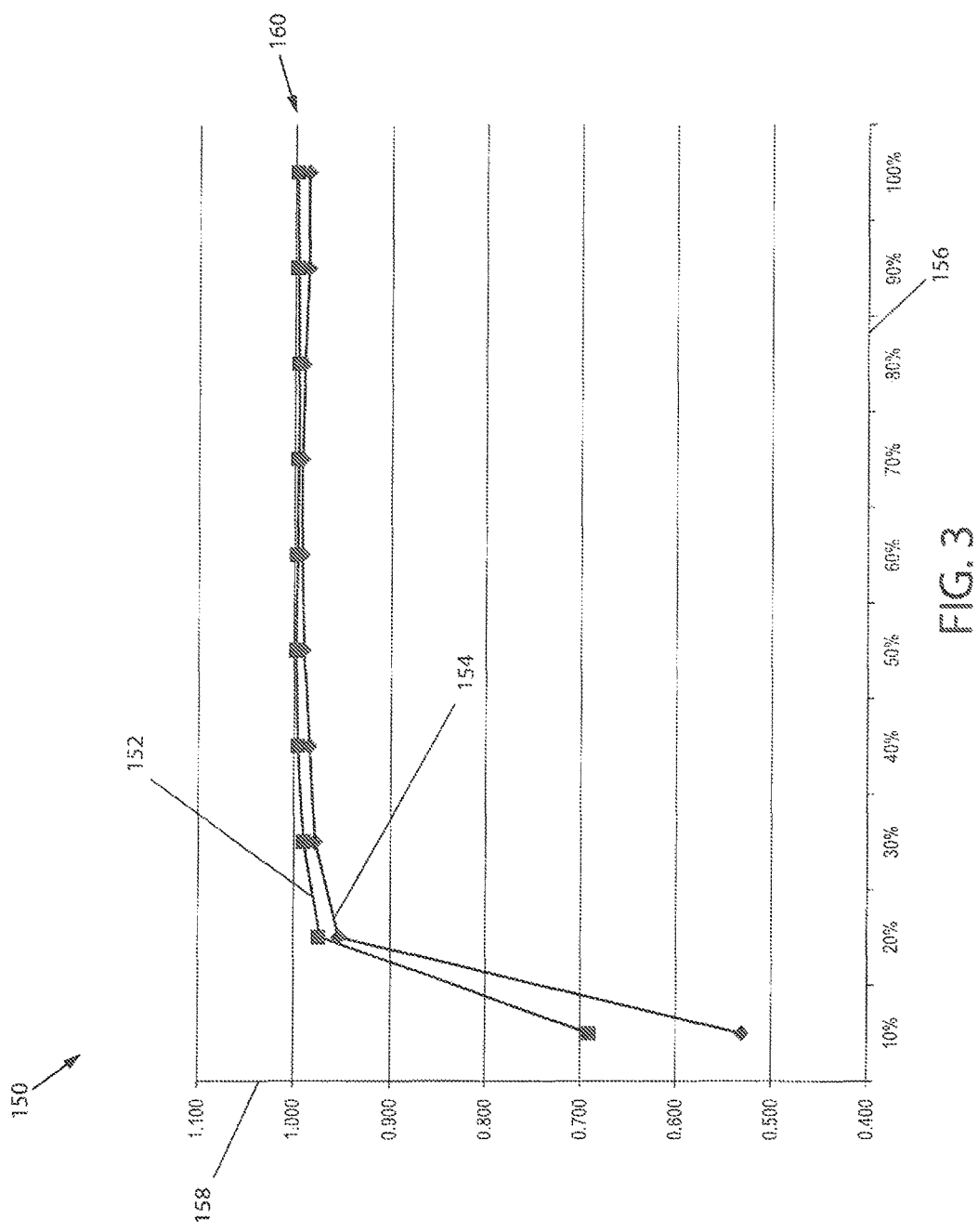

SYSTEM FOR POWER CONVERSION WITH REACTIVE POWER COMPENSATION

CROSS-REFERENCE TO RELATED APPLICATION(S)

This application claims priority to U.S. Provisional Patent Application No. 62/438,666, entitled "System for Power Conversion with Reactive Power Compensation," and U.S. Provisional Patent Application No. 62/438,636, entitled "System for Power Conversion with Feedback to Reduce DC Bus Loading," each filed on Dec. 23, 2016, which are herein incorporated by reference.

FIELD OF THE INVENTION

The present invention relates to the field of industrial control systems, and more particularly, to power conversion systems for driving loads, such as motors, in an industrial control environment.

BACKGROUND OF THE INVENTION

Power conversion systems for driving loads, such as motors, typically receive AC input power which is converted to an internal DC bus for subsequent conversion to AC output power for driving a load. The system typically includes a converter circuit which receives the AC input power for producing the internal DC bus, and an inverter circuit which receives the internal DC bus for producing the AC output power. The converter circuit and the inverter circuit each typically include multiple controlled switching devices, such as Insulated Gate Bipolar Transistors (IG-BT's), for producing the aforementioned DC bus and AC output power, respectively. Large input filters, such as "LCL" (inductor-capacitor-inductor) filters, are typically used to filter out higher order harmonics resulting from the switching action of the converter circuit. However, under lighter load conditions, this filter can be a significant source of reactive power that can affect system stability. Also, under heavier load conditions, this filter can consume reactive power from the AC input power (the power grid) which can increase system losses. A need therefore exists to provide a power conversion system for driving a load which addresses one or more of the foregoing disadvantages.

SUMMARY OF THE INVENTION

A power conversion system can be implemented to actively control a load while compensating for reactive power which may be sourced or consumed by an input filter circuit. In one aspect, the power conversion system can receive externally supplied multi-phase AC electric power, such as three-phase power from a power grid, and use a converter circuit to generate a DC bus. The power conversion system can then use an inverter circuit to generate multi-phase AC electric power from the DC bus for driving the load with adjustable frequencies and/or amplitudes as desired. The input filter circuit can be coupled to the converter circuit to filter out harmonics resulting from switching of the converter circuit. The power conversion system can receive feedback signals which may be used to determine reactive power sourced or consumed by the filter circuit, and can adjust the converter circuit to compensate for such reactive power.

An Active Front End (AFE) or Pulse Width Modulated (PWM) power conversion system typically uses large input filters, such as "LCL" (inductor-capacitor-inductor) filters, to filter out higher order harmonics resulting from the switching action of a power converter. Under lighter load conditions, this filter can be a significant source of reactive power that can affect system stability if the source is not sufficiently stable. Under heavier load conditions, this filter can consume reactive power from the power grid which can increase system losses. A control system according to the invention may be operable to operate the power conversion system to adaptively compensate for the reactive power as it is generated or consumed by the filter. Such compensation can be insensitive to the system phase sequence and can substantially maintain unity power factor (alignment of voltage and current phases per phase of electric power) at the point of common coupling with an external power source, such as the power grid. In addition, such compensation can compensate for the effect of the LCL transfer function and provide more accurate feed forward voltage terms for the operation of a current regulator. Moreover, such compensation algorithm can also provide more accurate decoupled voltage feedforward components for the current regulator.

The control system can essentially operate as an observer for the input filter. The control system can estimates an amount of current the capacitor of the input filter may draw. The control system can then adjust active and reactive current references to supply reactive current from the converter. This may ensure that the capacitor is not drawing current from an external power source, such as the power grid, and may help to maintain a unity power factor at the point of common coupling with the external power source. The control system can adjust a feed forward voltage for current regulation. The capacitor can be incorporated in a calculation to determine resonance suppression without the need for dedicated sensors.

Specifically then, one aspect of the present invention can provide a power conversion system including: a filter circuit configured to receive a multi-phase AC input power; a converter circuit coupled to the filter circuit, the converter circuit configured to convert the multi-phase AC input power to produce a DC bus, the converter circuit including a plurality of rectifier switching devices controlled by a plurality of rectifier switching control signals to produce the DC bus; an inverter circuit coupled to the DC bus, the inverter circuit including a plurality of inverter switching devices controlled by a plurality of inverter switching control signals to produce a multi-phase AC output power for driving a load; and a controller executing a program stored in a non-transient medium operable to: (a) control the converter circuit to provide active power for driving the load; and (b) control the converter circuit to supply reactive power to compensate for the filter circuit. In addition, in a grid-tie application in which the DC bus may be connected to a DC bus supply, such as a fuel cell or solar cell, the controller can execute to stabilize the grid by absorbing or supplying reactive power while maintaining unity power factor at the point of common coupling.

Another aspect of the present invention can provide a method for power conversion including: receiving a multi-phase AC input power at a filter circuit; converting the multi-phase AC input power to produce a DC bus using a converter circuit having multiple rectifier switching devices controlled by multiple rectifier switching control signals; producing a multi-phase AC output power for driving a load using an inverter circuit having multiple inverter switching devices coupled to the DC bus and controlled by multiple inverter switching control signals; and controlling the converter circuit to provide active power for driving the load while sourcing or consuming reactive power to compensate for the filter circuit.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which:

FIG. 3 is an exemplar waveform analysis which compares power factors between compensating and not compensating for reactive power, in accordance with an aspect of the invention.

DETAILED DESCRIPTION OF THE OF THE INVENTION

Figure 1:
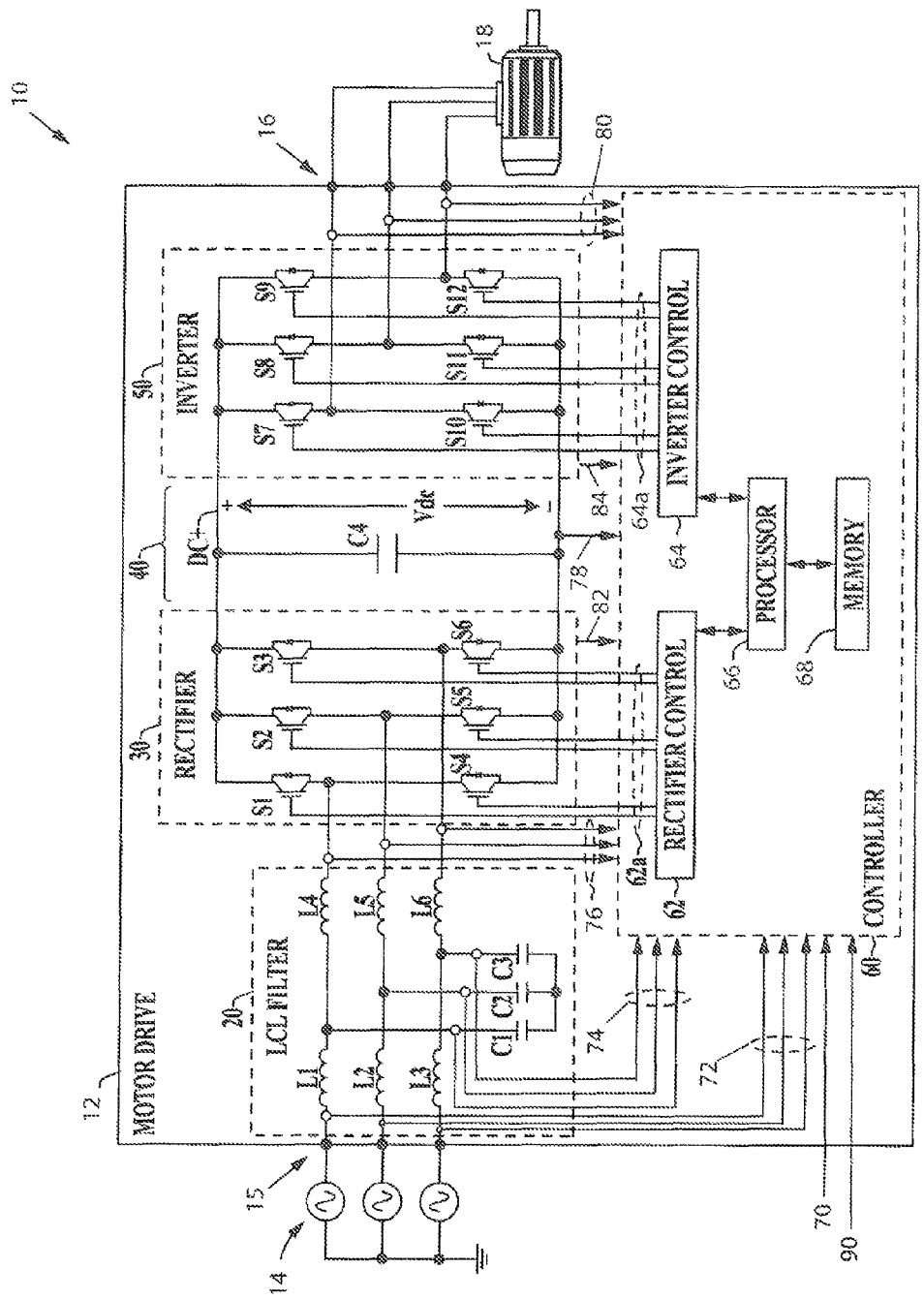
FIG. 1 is an industrial control system including a power conversion system implemented to actively control a load while compensating for reactive power in accordance with an aspect of the invention.

Referring now to FIG. 1, in accordance with an aspect of the invention, an industrial control system 10 can include a power conversion system 12 configured to receive multi-phase AC input power 14 at a plurality of AC input terminals 15 and provide multi-phase AC output power at a plurality of AC output terminals 16 for driving a load 18. The load 18 could be a motor, and the power conversion system 12 could be a motor drive type power conversion system receiving three-phase AC input power from a three-phase source, such as an electrical power grid. Although illustrated in the context of three-phase power driving a three phase motor load, it should be appreciated that the disclosed concepts can be employed in multi-phase power conversion systems having any number of input and output phases.

The power conversion system 12 includes a multi-phase input filter circuit 20 coupled between the AC input terminals 15 and an AC input for an active/switching rectifier circuit 30 (also referred to as a "converter" or an "active front end"). The filter circuit 20 can be configured to attenuate switching frequency harmonics which may be produced by the rectifier circuit 30. In one aspect, the filter circuit 20 can be an "LCL" input filter circuit which provides an inductor-capacitor-inductor arrangement for each power phase. Alternatively, the filter circuit 20 could be an "LC" input filter circuit or other arrangement. In the configuration of FIG. 1, the filter circuit 20 is an LCL filter circuit which includes inductors L1-L6 and Y-connected filter capacitors C1-C3. As shown, for a first power phase, the filter circuit 20 includes two series inductors, L1 and L4, and a Y-connected filter capacitor, C1, between the two series inductors. Similarly, for a second power phase, the filter circuit 20 includes two series inductors, L2 and L5, and a Y-connected filter capacitor. C2, between the two series inductors, and for a third power phase, the filter circuit 20 includes two series inductors, L3 and L6, and a Y-connected filter capacitor, C3, between the two series inductors. Accordingly, the three capacitors C1, C2 and C3 can be individually connected between a corresponding one of the filter phases and a common connection point, such as a neutral, as shown. In other examples, the filter capacitors C1, C2 and C3 can be connected in a Delta configuration (not shown).

An optional pre-charge circuit (not shown) can be coupled between the AC input terminals 15 and the filter circuit 20. If present, the pre-charge circuit can be configured to protect the power conversion system 12 from an in rush of current from the AC input power 14.

The power conversion system 12 further includes an intermediate DC bus circuit 40 ("DC bus") coupled to the rectifier circuit 30, an active/switching inverter circuit 50 coupled to the DC bus circuit 40, and a controller 60 in communication with the rectifier circuit 30, the DC bus circuit 40 and the inverter circuit 50. The controller 60 includes a rectifier control component 62 and an inverter control component 64 to provide rectifier switching control signals 62a and inverter switching control signals 64a to operate the rectifier circuit 30 and the inverter circuit 50, respectively. The controller 60 can also include processing and memory logic, such as a processor 66 in communication with a memory 68, for executing a program stored in a non-transient medium operable to implement advanced control capabilities implemented by the controller 60 according to various modes as detailed further hereinafter. Such processing logic, memory logic and/or control components can be implemented, for example, by way of one or more of microprocessors, microcontrollers, Digital Signal Processors (DSP's), Field Programmable Gate Arrays (FPGA's), Random Access Memories (RAM) and/or Flash memories which may be in communication with one another in various ways. Additionally, in other aspects, the rectifier circuit 30 can be connected to provide a shared DC bus (at the DC bus circuit 40) for driving multiple inverter circuits and, in turn, multiple motor loads.

In normal operation, the controller 60 can implement motor control functions by receiving the AC input power 14 at the AC input terminals 15 from an AC source, converting the AC input power into DC power (at the DC bus circuit 40) using the rectifier circuit 30, and converting the DC power (at the DC bus circuit 40) to adjustable frequency, adjustable amplitude multi-phase AC output power to drive the load 18, via the inverter circuit 50. The rectifier circuit 30 can include switching devices S1-S6 individually coupled between a corresponding one of the AC input phases and a corresponding DC bus terminal (DC+ or DC−) of the DC bus circuit 40. The rectifier control component 62 of the controller 60 can operate the rectifier circuit 30 in a switching mode via the rectifier switching control signals 62a. The rectifier switching control signals 62a can be provided to the rectifier switches S1-S6 to cause the rectifier circuit 30 to convert received three-phase AC input power to provide a DC voltage "Vdc" across a DC bus capacitance C4 of the DC bus circuit 40 using any suitable modulation technique, such as Pulse Width Modulated (PWM). The inverter circuit 50 can receive DC input power from the DC bus circuit 40, and can include inverter switches S7-S12 individually coupled between one of the positive or negative DC bus terminals and a corresponding output phase for coupling to the load 18. In certain aspects, the output of the inverter circuit 50 can be connected directly to the leads of the load 18 via the AC output terminals 16. In other aspects, one or more intervening components may be connected between the output of the inverter circuit 50 and the load 18, such as a filter and/or a transformer (not shown). The inverter switches S7-S 12 can be operated according to inverter switching control signals 64a provided by the inverter control component 64 of the controller 60. The inverter control component 64 can generate the inverter switching control signals 64a according to any suitable modulation technique, such as Pulse Width Modulated (PWM). Accordingly, the inverter circuit 50 can convert the DC power from the DC bus circuit 40 to provide adjustable frequency, adjustable amplitude AC output power to drive the load 18. The rectifier circuit 30 and the inverter circuit 50 can employ any suitable form of switching devices S1-S12, including, for example, any combination of Insulated Gate Bipolar Transistors (IGBT's), Silicon Controlled Rectifiers (SCR's), Gate Turn-Off Thyristors (GTO's) and/or Integrated Gate Commutated Thyristors (IGCT's).

As shown in FIG. 1, the controller 60 can be configured to receive multiple feedback signals representing operating parameters of the power conversion system 12. The feedback signals can be measured and/or used to calculate additional parameters by the controller 60. Specifically, the controller 60 can receive: a DC bus reference signal 70, which can be an externally supplied signal for determining a DC bus reference value, or which can represent a DC bus reference value set by the controller 60; feed forward current signals 72, which can be signals for determining current values for each phase at the input of the filter circuit 20; filter capacitor currents signals 74, which can be signals for determining current values for each phase, flowing in the capacitors C1-C3, at the filter circuit 20; active current feedback signals 76, which can be signals for determining current values for each phase at the input of the rectifier circuit 30; a DC bus signal 78, which can be a signal for determining a voltage value corresponding to the DC voltage "Vdc" across the DC bus capacitance C4 of the DC bus circuit 40; active power feedback signals 80, which can be signals for determining current values for each phase at the output of the rectifier circuit 30; a rectifier temperature signal 82, which can be a signal for determining a value corresponding to a temperature of the rectifier circuit 30; an inverter temperature signal 84, which can be a signal for determining a value corresponding to a temperature of the inverter circuit 50; and/or a reactive power reference signal 90, which can be an externally supplied signal for determining a reactive power value for the power conversion system 12, or which can be defaulted to a specific value set by the controller 60. Accordingly, the controller 60, via the processor 66, can execute a stored program which may be implemented as software and/or firmware for adjusting the rectifier circuit 30 and/or the inverter circuit 50, via the rectifier switching control signals 62a and/or the inverter switching control signals 64a, respectively, based on measured or determined values using one or more of the aforementioned feedback signals.

Figure 2:
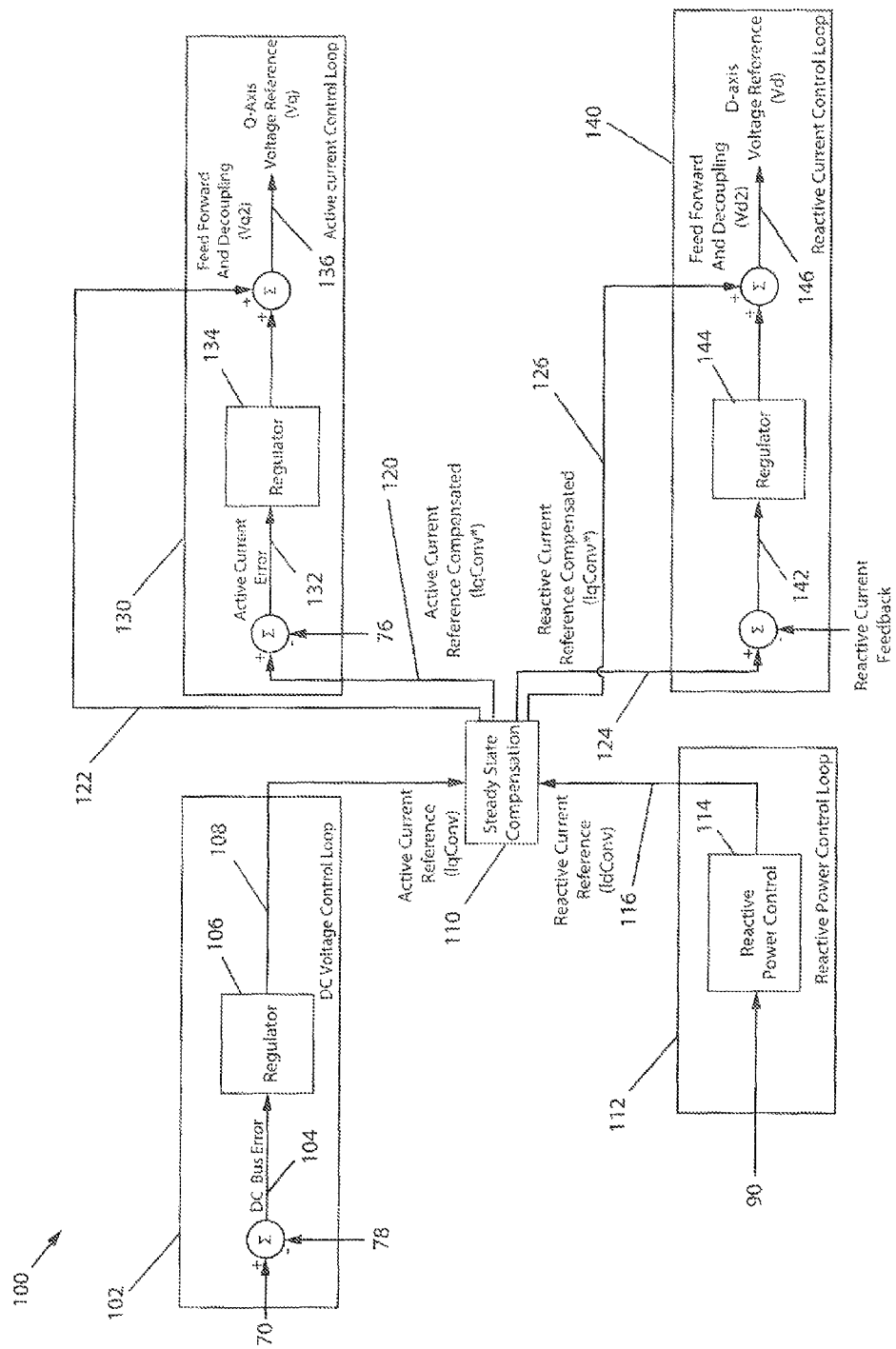
FIG. 2 provides control loops which may be executed by a controller in the power conversion system of FIG. 1.

With additional reference to FIG. 2, in one aspect, to actively control a load, such as the load 18, while compensating for reactive power which may be sourced or consumed by the filter circuit 20, such as the capacitors C1-C3, the controller 60 can receive one or more of the aforementioned feedback signals and execute control loops 100. In a first control loop 102, which may be a DC voltage control loop, the controller 60 can compare a value determined from the DC bus reference signal 70 to a value determined from the DC bus signal 78 to produce a DC bus error 104 representing a difference between the two values. The DC bus error 104 can then be applied to a first regulator function 106 to produce an active current reference 108 to be applied by a steady state compensation function 110 implemented by the controller 60.

In a second control loop 112, which may be a reactive power control loop, the controller 60 can apply a value from the reactive power reference signal 90 to a reactive power control function 114 to convert the value to a reactive current reference 116. The reactive current reference 116 can then be applied to the steady state compensation function 110, along with the active current reference 108, to produce outputs for actively controlling the load 18 while compensating for reactive power which may be sourced or consumed by the filter circuit 20, via adjustment of the rectifier circuit 30. In particular, the controller 60 can execute the steady state compensation function 110 to produce outputs including:

a compensated active current reference 120, which can be determined by applying:

$$I^*_{qconv} = \frac{I_{qgrid} - \omega^2 C_{eq}((L_1 - M_1) - R^2_{eq}C_{eq} - R_1 R_{eq} C_{eq})I_{qgrid} - \omega^2 C^2_{eq} R_{eq} V_{qgrid}}{\omega^2 C^2_{eq} R^2_{eq} + 1}$$

an active feed forward adjustment 122, which can be determined by applying:

$$V_{q2} = \left\{[(1 - \omega^2 C_{eq}(L_2 - M_2) + \omega^2 C^2_{eq} R^2_{eq} + \omega^2 C^2_{eq} R_{eq} R_2) V_{qgrid}] - \left[\begin{pmatrix} R_1 + R_2 + \omega^2 C^2_{eq} R^2_{eq} R_1 + \omega^2 C^2_{eq} R^2_{eq} R_2 - \\ \omega^2 C_{eq} R_2 (L_1 - M_1) + \\ \omega^2 C_{eq} R_1 (L_2 - M_2) - \omega^2 C^2_{eq} R_{eq}(L_1 - M_1)(L_2 - M_2) + \\ \omega^2 C^2_{eq} R_{eq} R_1 R_2 \end{pmatrix} I_{qgrid}\right]\right\} / \omega^2 C^2_{eq} R^2_{eq} + 1$$

a compensated reactive current reference 124, which can be determined by applying:

$$I^*_{dcov} = \frac{\omega C_{eq} V_{qgrid} - (\omega C_{eq} R_1 + \omega^2 C^2_{eq} R_{eq}(L_1 - M_1))I_{qgrid}}{\omega^2 C^2_{eq} R^2_{eq} + 1}$$

and a reactive feed forward adjustment 126, which can be determined by applying:

$$V_{d2} = \left\{[-\omega C_{eq}(\omega^2 C_{eq} R_{eq}(L_2 - M_2) + R_2)\right.$$

-continued $$V_{qgrid}] + \left|\omega \begin{pmatrix} (L_1 - M_1) + (L_2 - M_2) + C_{eq}R_1R_2 + \omega^2 C_{eq}^2 R_{eq}^2(L_1 - M_1) + \\ \omega^2 C_{eq} R_2(L_2 - M_2) - \\ \omega^2 C_{eq}(L_1 - M_1)(L_2 - M_2) + \omega^2 C_{eq}^2 R_{eq}(L_1 - M_1) + \\ \omega^2 C_{eq}^2 R_{eq} R_1(L_2 - M_2) \end{pmatrix} \right|$$

$$I_{qgrid} \bigg\} \bigg/ \omega^2 C_{eq}^2 R_{eq}^2 + 1$$

Where Iqconv* and Idconv* are active and reactive compensated current commands, respectively: Vq2 and Vd2 are active and reactive feed forward commands, respectively; Vqgrid and Iqgrid are grid reference voltages and currents, respectively, ω is a source frequency; Ceq is a Y-equivalent value of the input filter (LCL) capacitor; Req is a Y-equivalent value of the damping resistor; R1 is an equivalent resistor of a source side inductor, R2 is an equivalent resistor of a converter side inductor; L1 is a source side inductance; L2 is a converter side inductance; M1 is a mutual inductance of the line source side inductor, and M2 is a mutual inductance of the line converter side inductor.

In a third control loop 130, which may be an active current control loop, the controller 60 can compare the compensated active current reference 120 to one or more values determined from the active current feedback signals 76 for each power phase, respectively, to produce one or more active current errors 132 representing differences between the values. The active current errors 132 can then be applied to a second regulator function 134 to produce an output to be summed in an active current control summation with corresponding values from the active feed forward adjustment 122. The active current control summation can then produce first voltage reference values 136 which may be with respect to a Q-axis.

In a fourth control loop 140, which may be a reactive current control loop, the controller 60 can compare the compensated reactive current reference 124 to one or more values determined from reactive current feedback for each power phase, respectively, to produce one or more reactive current errors 142 representing differences between the values. The reactive current errors 142 can then be applied to a third regulator function 144 to produce an output to be summed in a reactive current control summation with corresponding values from the reactive feed forward adjustment 126. The reactive current control summation can then produce second voltage reference values 146 which may be with respect to a D-axis. In one aspect, the processor 66 can calculate the reactive current feedback that is compared to the compensated reactive current reference 124, without the need for dedicated sensors. In another aspect, sensors can be present in power conversion system 12 to produce the filter capacitor currents signals 74 which can be used to determine the reactive current feedback.

Finally, the first voltage reference values 136, which may be with respect to the Q-axis, and the second voltage reference values 146, which may be with respect to a D-axis, can then be used by the processor 66 for adjusting/updating the rectifier switching control signals 62a to be applied to the rectifier circuit 30 to actively control the load 18 while compensating for reactive power which may be sourced or consumed by the filter circuit 20.

Referring now to FIG. 3, by way of example, a waveform analysis 150 compares a first waveform 152 in which the controller 60 adjusts/updates the rectifier switching control signals 62a to compensate for reactive power sourced or consumed by the filter circuit 20, with a second waveform 154 in which the controller 60 does not adjust/update the rectifier switching control signals 62a to compensate for reactive power sourced or consumed by the filter circuit 20. As utilization of the load 18 increases, shown with respect to horizontal x-axis 156, the first waveform 152, with reactive power compensation enabled, more quickly approaches a power factor (alignment of voltage and current phases per phase of electric power) of unity (1.00), shown by reference numeral 160, with respect to vertical y-axis 158, at a point of common connection represented by the AC input terminals 15. Moreover, the first waveform 152, with reactive power compensation enabled, substantially maintains the unity power factor with increasing load, whereas the second waveform 154, without reactive power compensation, slowly approaches and stabilizes at less than a unity power factor.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A power conversion system comprising:
   a filter circuit configured to receive a multi-phase AC input power,
   a converter circuit coupled to the filter circuit, the converter circuit configured to convert the multi-phase AC input power to produce a DC bus, the converter circuit including a plurality of rectifier switching devices controlled by a plurality of rectifier switching control signals to produce the DC bus;
an inverter circuit coupled to the DC bus, the inverter circuit including a plurality of inverter switching devices controlled by a plurality of inverter switching control signals to produce a multi-phase AC output power for driving a load; and
a controller executing a program stored in a non-transient medium operable to:
(a) control the converter circuit to provide active power for driving the load; and
(b) control the converter circuit to source or consume reactive power to compensate for the filter circuit,
wherein the controller determines active and reactive current values,
wherein the active current value is determined from a feedback signal from an input of the converter circuit, and
wherein the controller compares the active current value to an active current reference, and the reactive current value to a reactive current reference, for providing the active and reactive power.

2. The system of claim 1, wherein the filter circuit is an LCL (inductor-capacitor-inductor) circuit.

3. The system of claim 2, wherein the reactive power is operable to compensate for a transfer function of the LCL circuit.

4. The system of claim 1, wherein the controller executes one or more control loops to determine the active power and the reactive power.

5. The system of claim 4, wherein the one or more control loops include:
a first control loop which compares a DC bus reference value to the DC bus to produce a DC bus error for generating an output for producing the active current reference; and
a second control loop which applies a reactive power reference value for generating an output for producing the reactive current reference.

6. The system of claim 5, wherein the active and reactive current references are compensated active and compensated reactive current references, respectively, wherein the controller determines the active power by executing a third control loop which compares the compensated active current reference to an active current feedback value, and wherein the controller determines the reactive power by executing a fourth control loop which compares the compensated reactive current reference to a reactive current feedback value.

7. The system of claim 6, wherein the active current feedback value is determined from the feedback signal corresponding to a current between the filter circuit and the converter circuit.

8. The system of claim 6, wherein the feedback signal is a first feedback signal, and wherein the reactive current feedback value is determined from a second feedback signal corresponding to a current through a capacitor of the filter circuit.

9. The system of claim 1, wherein the controller is further operable to control the converter circuit to:
source reactive power with higher active power for driving the load; and
consume reactive power with lower active power for driving the load.

10. A method for power conversion comprising:
receiving a multi-phase AC input power at a filter circuit;
converting the multi-phase AC input power to produce a DC bus using a converter circuit having a plurality of rectifier switching devices controlled by a plurality of rectifier switching control signals;
producing a multi-phase AC output power for driving a load using an inverter circuit having a plurality of inverter switching devices coupled to the DC bus and controlled by a plurality of inverter switching control signals; and
controlling the converter circuit to provide active power for driving the load while sourcing or consuming reactive power to compensate for the filter circuit,
wherein controlling the converter circuit comprises:
determining active and reactive current values, wherein the active current value is determined from a feedback signal from an input of the converter circuit; and
comparing the active current value to an active current reference and the reactive current value to a reactive current reference, for providing the active and reactive power.

11. The method of claim 10, wherein the filter circuit is an LCL (inductor-capacitor-inductor) circuit.

12. The method of claim 11, further comprising compensating for a transfer function of the LCL circuit via the reactive power.

13. The method of claim 10, further comprising executing one or more control loops for determining the active power and the reactive power.

14. The method of claim 13, wherein the one or more control loops include:
a first control loop comparing a DC bus reference value to the DC bus to produce a DC bus error for generating an output for producing the active current reference; and
a second control loop applying a reactive power reference value for generating an output for producing the reactive current reference.

15. The method of claim 14, wherein the active and reactive current references are compensated active and compensated reactive current references, respectively, determining the active power by executing a third control loop comparing the compensated active current reference to an active current feedback value, and determining the reactive power by executing a fourth control loop comparing the compensated reactive current reference to a reactive current feedback value.

16. The method of claim 15, wherein the active current feedback value is determined from a feedback signal corresponding to a current between the filter circuit and the converter circuit.

17. The method of claim 15, wherein the feedback signal is a first feedback signal, and further comprising determining the reactive current feedback value from a second feedback signal corresponding to a current through a capacitor of the filter circuit.

18. The method of claim 10, further comprising:
sourcing reactive power with higher active power for driving the load; and
consuming reactive power with lower active power for driving the load.

* * * * *